No. 610,961. Patented Sept. 20, 1898.
P. DAVIES.
BALL BEARING.
(Application filed Aug. 15, 1896.)
(No Model.)

Witnesses
Inventor
Preston Davies
By his Attorneys
Baldwin, Davidson & Wight

THE NORRIS PETERS CO., PHOTO-LITHO., WASHINGTON, D. C.

UNITED STATES PATENT OFFICE.

PRESTON DAVIES, OF LONDON, ENGLAND.

BALL-BEARING.

SPECIFICATION forming part of Letters Patent No. 610,961, dated September 20, 1898.

Application filed August 15, 1896. Serial No. 602,832. (No model.) Patented in England June 12, 1894, No. 11,379, and in France May 8, 1895, No. 247,246.

*To all whom it may concern:*

Be it known that I, PRESTON DAVIES, a subject of the Queen of Great Britain, residing at Southfields, London, in the county of Surrey, England, have invented certain new and useful Improvements in Ball-Bearings, (for which I have received Letters Patent in Great Britain, No. 11,379, dated June 12, 1894, and in France, No. 247,246, dated May 8, 1895,) of which the following is a specification.

The object of the invention is to provide a ball-bearing of novel construction and mode of operation applicable to bicycles, as well as to other vehicle-wheels and rotary bodies.

The invention consists in a new organization, hereinafter set forth in detail, wherein sets of bearing-balls run in channels between inclined bearing-surfaces formed on annular members of the bearing, one or more of which are capable of moving freely longitudinally, so that the load carried by the bearing is equally distributed between the sets of bearing-balls and so that however irregularly the bearing of one set of balls may wear with reference to another all of the sets may be readily and simultaneously adjusted.

In the accompanying drawings, Figure 1 is a longitudinal section through a velocipede driving-wheel and its hub with my improved ball-bearing applied thereto; Fig. 2, a longitudinal section through a bottom bracket-bearing constructed in accordance with my invention; Fig. 3, a view similar to Fig. 1, showing an increased number of sets of bearing-balls and annular bearing members. Fig. 4 is a view similar to Fig. 2, but having an increased number of sets of bearing-balls and annular members.

Each figure of the drawings shows two main parts—viz., a shaft or axle C and a surrounding casing D. In each instance a bearing is interposed between the shaft or axle and the casing, which comprises a series of annular members having bearing-surfaces for balls, which are arranged between the members.

The particular manner of arranging the annular members and the balls within the casing around the shaft or axle may be somewhat varied. In Fig. 1 I have shown one specific way of embodying my invention. In this instance the axle C is surrounded by a casing D, to which is secured a chain-wheel A. The shaft or axle is screw-threaded at its opposite ends and carries screw-nuts B B', serving as adjustable abutments, as hereinafter explained. One of these nuts or members B B' need not be movable except for the purpose of assembling the parts of the bearing. The interior diameter of the casing D is greater than the diameter of the axle C and is made to accommodate a series of rings or annular members F E E' and a collar or annular member G. The rings loosely encircle the axle and are connected to or in contact with the casing D, so as to revolve therewith, but those F E are free to move longitudinally relatively to the axle. This may be conveniently arranged by an ordinary feather-and-groove connection $f$. The casing is provided with two annular flanges or abutments $d\ d'$. The ring E' bears against the flange $d'$ and the ring E bears against the flange $d$. The collar G is shown as arranged between the rings E and F, and it is connected to the axle C by means of a pin $g$ and a groove $g'$. The nuts, rings, and collar are formed with inclined bearing-surfaces $x$, and the ring F and collar G are each provided with such bearing-surfaces on opposite sides of their diametric centers. Bearing-balls H are interposed between the bearing-surfaces of the rings, collar, and nuts, as indicated. The nut B, while adjustable on the screw-threaded end of the axle, may when once adjusted be stationary, while the nut B' may alone be used as the adjusting-nut. Adjustment may be made so that the balls will all be held in proper position to effect the best results. Should any wear occur, the nut B' may be turned to move the rings and collar in such manner as to take up wear wherever it occurs. The preferred arrangement for bicycle-bearings is as shown in Fig. 1, where the rings E E', instead of being at each end of the bearing, as heretofore generally made, are so placed that one ring E' is at or near one end, while the other ring E is more toward the center of the bearing to allow of the introduction of other rings and collars.

In Fig. 2 the axle C has in addition to the loose collar G two collars G' rigidly secured to it, and the flanges $d\ d'$ of Fig. 1 are dispensed with. Nuts B² B³ are screwed into the ends of the casing D and are held in place by locking devices. The nut B³ is shown as held by a set-screw K', bearing against a plug k' of soft metal, which in its turn bears on the threads of the nut B³. The set-screw may be secured in position by a lock-nut k². The nut B² is held in place by a screw K, passing into an aperture k in the nut. A lock-nut k² may also be employed in this instance. The collar G is connected to the axle, as in Fig. 1, so that it can move to a limited extent longitudinally on the axle without turning thereon. A ring F loosely surrounds the axle and is connected with the casing, as in Fig. 1, so that it can be moved to a limited extent longitudinally relatively to the axle. Balls H are interposed between inclined bearing-surfaces formed on the collars G G' G', the ring F, and the nuts B² B³. The nut B² may be adjusted to the proper position and locked and need not be disturbed for adjustment. The nut B³ may alone be used as the adjusting-nut. When wear occurs, this nut may be screwed up to cause an adjustment of the bearing-surfaces throughout the bearing. The number of the rows of balls, as well as the disposition of the collars and rings, may be varied without departing from my invention. I do not, therefore, limit myself to the particular arrangement shown and described.

It is obvious that in all of these figures the entire series of balls may be equally adjusted by the manipulation of either of the adjusting-nuts B B' or B² B³.

Figure 1:
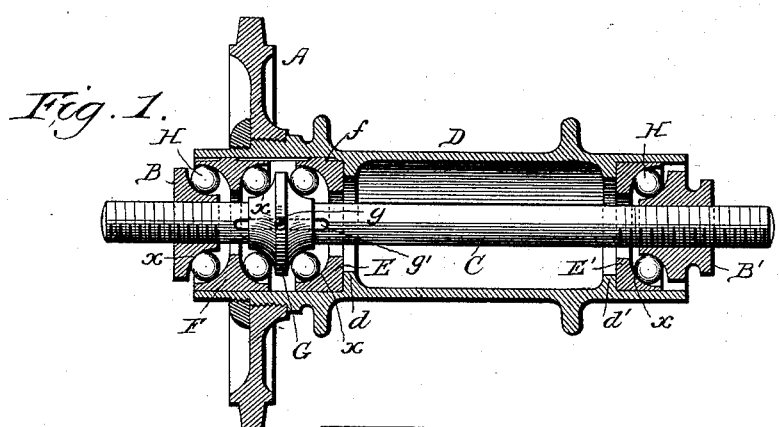
Figure 2:
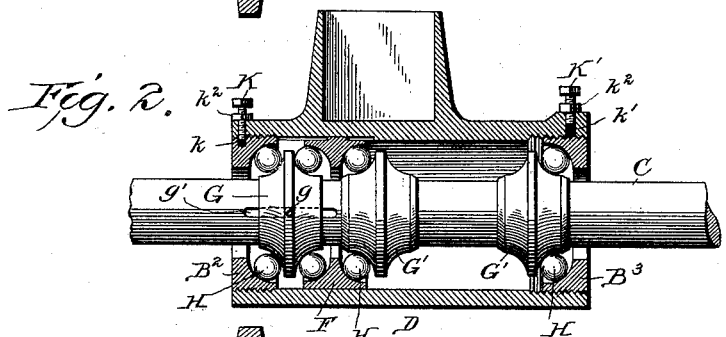
Figure 3:
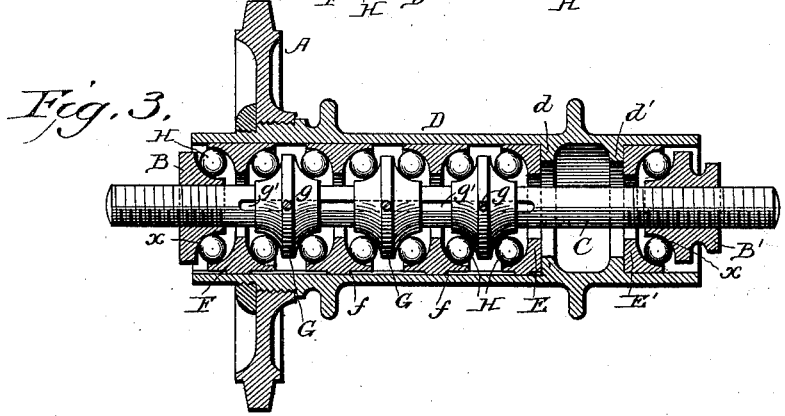
Fig. 3 shows a bearing similar in all respects to that shown in Fig. 1, except that it has seven sets of bearing-balls and six rings and collars between the nut B and the flange d.
Figure 4:
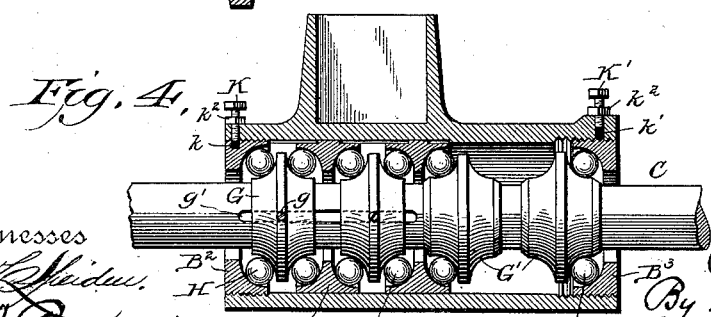
Fig. 4 illustrates a bearing similar in all respects to that shown in Fig. 2, except that it has six sets of bearing-balls and six collars and rings between the nuts B² B³.

In Figs. 1 and 3 the part or nut B and the flange d serve as abutments that restrict endwise movement of the shaft or axle from left to right or of the casing from right to left, while the nut B' and flange d' serve as abutments to restrict endwise movement of such parts, respectively, in the opposite directions. In Figs. 2 and 4 the nut B³ and the fixed collar G' adjacent to it serve to restrict endwise movement of the shaft or axle from left to right and of the casing in the reverse direction, while the nut B² and other fixed collar G' adjacent to it serve to restrict endwise movement of such parts, respectively, in opposite directions. The parts B d, B' d', B³ G', and B² G' serve, therefore, as abutments for restricting endwise play of the axle and casing.

In a bearing of this character the load is equally distributed between the sets of bearing-balls and the bearings of all the balls may be adjusted by one mechanical action, as by the manipulation of the nut B' or B³. These two features are due to the fact that certain of the members of the bearings—i. e., the rings and collars—are free to slide longitudinally of the axis of the bearing, thus distributing the load and permitting of adjustment to take up wear throughout the bearing. The essential feature of the invention is therefore present in an organization wherein multiple sets of bearing-balls run in channels between inclined bearing-surfaces formed on members, as the rings and collars, of the bearing, the requisite number of which are free to move longitudinally of the axis.

I claim as my invention—

1. An axle or shaft and a surrounding casing, one of which is rotary, in combination with an interposed bearing comprising an annular member arranged within the casing and surrounding the axle, mounted upon one of said parts so as to rotate therewith and out of contact with the other, free to move longitudinally of the bearing, and having two inclined bearing-surfaces, one on each side of its diametric center, two other annular members, one on each side of said first-mentioned member, mounted upon that part with which said first-mentioned member is out of contact, and each having an inclined bearing-surface corresponding with and overlapping the adjacent bearing-surface on said first-mentioned member, bearing-balls running in the two channels formed by the four bearing-surfaces, and means whereby one of the two last-named members may be closed up toward the others to simultaneously adjust the bearing-surfaces to take up wear of both sets of bearing-balls.

2. An axle or shaft and a surrounding casing, one of which is rotary, in combination with an interposed bearing comprising two annular members arranged within the casing and surrounding the axle, one being mounted on the casing to move freely longitudinally and out of contact with the axle, and the other mounted on the axle to move freely longitudinally and out of contact with the casing, and both of said members having inclined ball-bearing surfaces, two other annular members one at each side of the pair of first-mentioned members and respectively mounted upon the axle and casing, and each having an inclined ball-bearing surface, bearing-balls running in the channels formed by the bearing-surfaces, and means whereby one of the two last-named members may be closed up toward the others to simultaneously adjust the bearing-surfaces of all the balls to take up wear.

3. An axle or shaft and a surrounding casing, one of which is rotary, in combination with an interposed bearing comprising annular members arranged within the casing and surrounding the axle and alternately connected with the casing and out of contact with the axle, and connected with the axle and out of contact with the casing, said members having inclined ball-bearing surfaces and being free to move longitudinally upon the part with which they are connected, a nut or abutment having a ball-bearing surface mounted upon one of said parts at one end of such assemblage of members, an adjusting-nut having also a ball-bearing surface at the other end thereof, and bearing-balls running in the several channels between the bearing-surfaces.

4. The combination of two parts, viz: an axle or shaft and a surrounding casing, one of which is rotary, and an interposed bearing comprising annular members arranged within the casing and surrounding the axle and respectively connected with the casing and out of contact with the axle, and with the axle and out of contact with the casing, said members having inclined ball-bearing surfaces and being free to move longitudinally upon the part with which they are connected, two abutments upon one of said parts, two other abutments upon the other of said parts, also having ball-bearing surfaces, and coöperating with the first-named abutments, bearing-balls running in channels formed by bearing-surfaces upon the abutments and other members of the bearing, and means whereby one of said abutments located at one end of the bearing may be adjusted to take up wear throughout the bearing.

5. An axle or shaft and a surrounding casing, one of which is rotary, in combination with an interposed bearing comprising annular members arranged within the casing and surrounding the axle and respectively connected with the casing and out of contact with the axle, and with the axle and out of contact with the casing, said members having inclined ball-bearing surfaces and being free to move longitudinally upon the part with which they are connected, bearing-balls running between the bearing-surfaces of adjacent members, abutments for restricting endwise movement of the axle and casing, and means for adjusting the bearing, to take up wear throughout it, at one end of the bearing.

6. An axle or shaft and a surrounding casing, one of which is rotary, in combination with an interposed bearing comprising an annular member arranged within the casing and surrounding the axle, mounted upon one of said parts so as to rotate therewith, and out of contact with the other, free to move longitudinally of the bearing, and having two inclined bearing-surfaces, one on each side of its diametric center, two other annular members, one on each side of said first-mentioned member, mounted upon that part with which said first-mentioned member is out of contact, and each having an inclined bearing-surface corresponding with and overlapping the adjacent bearing-surface on said first-mentioned member, bearing-balls running in the two channels formed by the four bearing-surfaces, means whereby one of the two last-named members may be closed up toward the other to simultaneously adjust the bearing-surfaces to take up wear of both sets of bearing-balls, and abutments that restrict endwise movement of the axle and casing.

7. An axle or shaft and a surrounding casing, one of which is rotary, in combination with an interposed bearing comprising two annular members arranged within the casing and surrounding the axle, one being mounted on the casing to move freely longitudinally and out of contact with the axle, and the other mounted on the axle to move freely longitudinally and out of contact with the casing, and both of said members having inclined ball-bearing surfaces, two other annular members one at each side of the pair of first-mentioned members respectively mounted upon the axle and casing respectively, and each having an inclined ball-bearing surface, bearing-balls running in the channels formed by the bearing-surfaces, means whereby one of the two last-named members may be closed up toward the others to simultaneously adjust the bearing-surfaces of all the balls to take up wear, and abutments fixed respectively upon the axle and casing that restrict endwise movement of the axle and casing.

8. An axle or shaft and a surrounding casing, one of which is rotary, in combination with two annular abutments fixed to one of said parts and out of contact with the other, and a ball-bearing comprising annular members respectively in contact with the casing and out of contact with the axle and in contact with the axle and out of contact with the casing, and having inclined ball-bearing surfaces, two end nuts or abutments, one at each end of the bearing, and bearing-balls running between adjacent bearing-surfaces, annular members of the bearing being free to move longitudinally on the adjustment of one of said nuts to adjust the bearing-surfaces throughout the bearing.

9. The combination, substantially as set forth, of a fixed shaft or axle, a rotary casing having internal annular abutment-flanges, and a ball-bearing comprising annular members having inclined ball-bearing surfaces connected respectively with the casing and out of contact with the axle and with the axle and out of contact with the casing, two of said members being in contact with said abutment-flanges, abutments or nuts on the axle at each end of the bearing, and bearing-balls running between adjacent bearing-surfaces, annular members of the bearing being capable of moving freely longitudinally, whereby on the adjustment of one of said nuts the bearing-surfaces throughout the bearing are adjusted.

In testimony whereof I have hereunto subscribed my name.

PRESTON DAVIES.

Witnesses:
A. F. SPOONER,
ALFRED WITHERS.